(12) United States Patent
Rabbat et al.

(10) Patent No.: US 10,944,905 B2
(45) Date of Patent: Mar. 9, 2021

(54) CREATION AND DISPLAY OF A 360 DEGREE LOOPING VIDEO FILE

(71) Applicant: Gfycat, Inc., Palo Alto, CA (US)

(72) Inventors: Richard Rabbat, Palo Alto, CA (US); Ernestine Fu, Northridge, CA (US)

(73) Assignee: Gfycat, Inc., Palo Alto, CA (US)

( * ) Notice: Subject to any disclaimer, the term of this patent is extended or adjusted under 35 U.S.C. 154(b) by 0 days.

(21) Appl. No.: 16/413,408

(22) Filed: May 15, 2019

(65) Prior Publication Data

US 2019/0356847 A1     Nov. 21, 2019

Related U.S. Application Data

(60) Provisional application No. 62/671,746, filed on May 15, 2018.

(51) Int. Cl.
*H04N 5/232* (2006.01)
*G11B 27/34* (2006.01)

(52) U.S. Cl.
CPC ......... *H04N 5/23238* (2013.01); *G11B 27/34* (2013.01)

(58) Field of Classification Search
CPC .......................... H04N 5/23238; G11B 27/34
See application file for complete search history.

(56) References Cited

U.S. PATENT DOCUMENTS

| 10,354,547 | B1* | 7/2019 | Falstrup | G06F 3/011 |
| 2017/0337737 | A1* | 11/2017 | Edwards | F16M 13/04 |
| 2018/0147110 | A1* | 5/2018 | Cakmak | A63F 13/00 |
| 2019/0068942 | A1* | 2/2019 | Schiarizzi | G06F 16/00 |
| 2019/0158800 | A1* | 5/2019 | Kokare | H04N 13/189 |

* cited by examiner

*Primary Examiner* — Mishawn N. Hunter
(74) *Attorney, Agent, or Firm* — Schwegman Lundberg & Woessner, P.A.

(57) ABSTRACT

In a method for generating a 360 degree looping video file, a source 360 degree video file is received. At least one configuration setting is received for a 360 degree looping video file, the at least one configuration comprising a projection type of the 360 degree looping video file. The 360 degree looping video file is generated based at least on the source 360 degree video file and the projection type, the 360 degree looping video file comprising a video data file and spatial mapping instructions, wherein the 360 degree looping video file, when executed at an electronic device, displays the video data file according to the spatial mapping instructions.

20 Claims, 6 Drawing Sheets

CREATION AND DISPLAY OF A 360 DEGREE LOOPING VIDEO FILE

RELATED APPLICATIONS

This application claims priority to and the benefit of U.S. Patent Provisional Patent Application 62/671,746, filed on May 15, 2018, entitled "CREATION AND DISPLAY OF A 360 DEGREE LOOPING VIDEO FILE," by Rabbat et al., and assigned to the assignee of the present application, which is incorporated herein by reference in its entirety.

BACKGROUND

Media files, such as audio and video files, are used in a variety of environments for conveying many types of information. For example, media files can be streamed or otherwise communicated over computer networks, allowing users to view and/or listen to the media content. With the advent of the Internet, the amount of video content available to users has grown exponentially, as has the media platforms upon which the video content is available for viewing. As the volume of content providers of video content grows, it is increasingly important for content providers to improve the viewing experience for the users to increase user engagement.

BRIEF DESCRIPTION OF DRAWINGS

The accompanying drawings, which are incorporated in and form a part of the Description of Embodiments, illustrate various embodiments of the subject matter and, together with the Description of Embodiments, serve to explain principles of the subject matter discussed below. Unless specifically noted, the drawings referred to in this Brief Description of Drawings should be understood as not being drawn to scale. Herein, like items are labeled with like item numbers.

DESCRIPTION OF EMBODIMENTS

Figure 1:
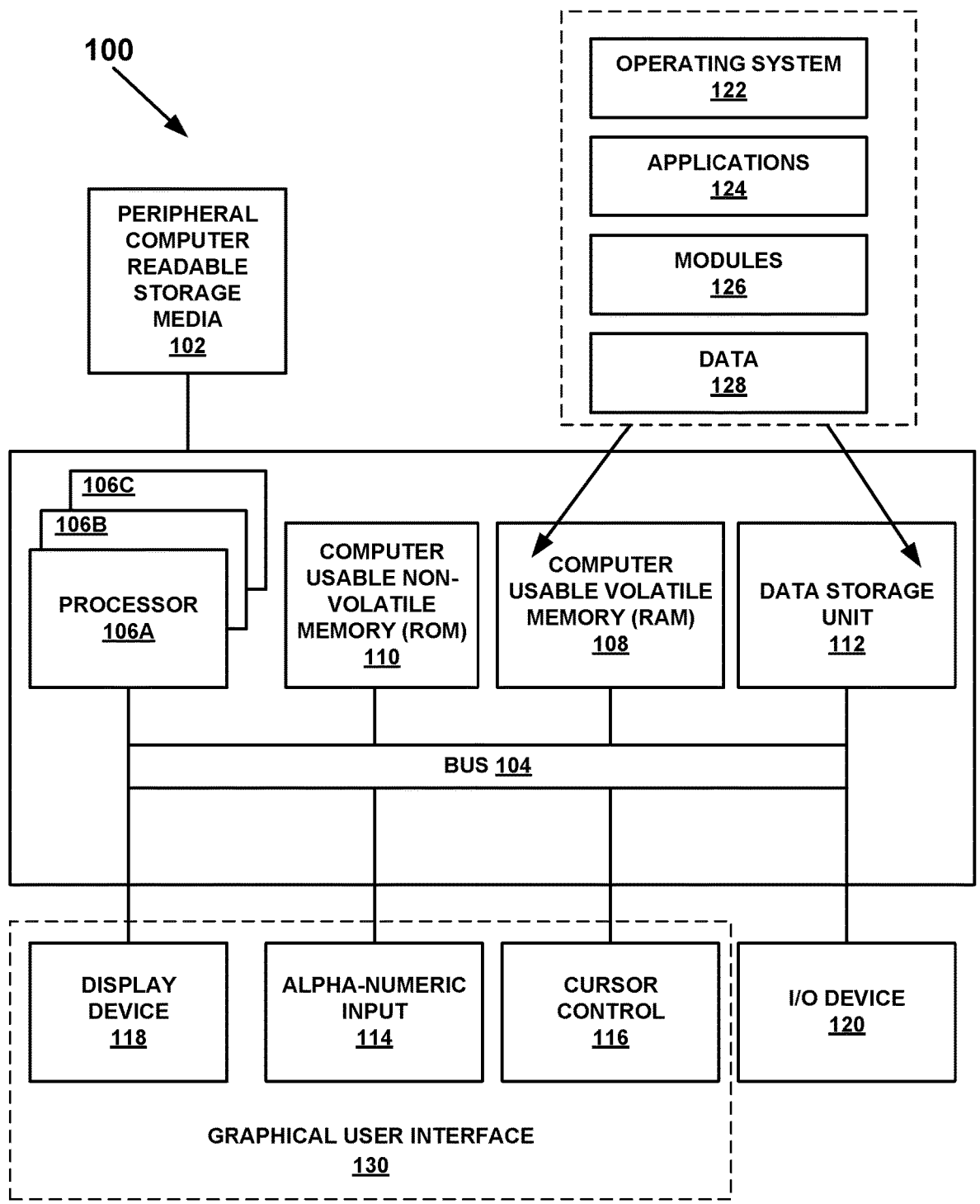
FIG. 1 illustrates an example computer system upon which embodiments described herein be implemented.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "generating," "receiving," "selecting," "transcoding," "executing," "transmitting," "displaying," or the like, refer to the actions and processes of an electronic device such as: a processor, a processor, an optical sensor, a sensor, a memory, a mobile electronic device, a sensor processing unit, a sensor processor, or the like, or a combination thereof. The electronic device manipulates and transforms data represented as physical (electronic and/or magnetic) quantities within the electronic device's registers and memories into other data similarly represented as physical quantities within the electronic device's memories or registers or other such information storage, transmission, processing, or display components.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example mobile electronic device described herein may include components other than those shown, including well-known components.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more motion processing units (MPUs), sensor processing units (SPUs), processor(s) or core(s) thereof, digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

Overview of Discussion

Discussion begins with a description of an example computer system upon which embodiments of the present invention may be implemented. Examples of a 360 degree looping video file and systems for creating and displaying 360 degree looping video files are then described. Example operations of creating and displaying 360 degree looping video files are then described.

In accordance with various embodiments, methods and systems for generating a 360 degree looping video file, are described. In one embodiment, in a method for generating a 360 degree looping video file, a source 360 degree video file is received. In one embodiment, the source 360 degree video file is a short form looping prerecorded video file. In some embodiments, the source 360 degree video file is received from a virtual reality headset.

At least one configuration setting for a 360 degree looping video file is received, the at least one configuration including a projection type of the 360 degree looping video file. In some embodiments, the at least one configuration setting further includes a start time marker and an end time marker. In some embodiments, the at least one configuration setting includes a resolution.

A 360 degree looping video file is generated based at least on the source 360 degree video file and the projection type, where the 360 degree looping video file includes a video data file and spatial mapping instructions. The 360 degree looping video file, when executed at an electronic device, displays the video data file according to the spatial mapping instructions. In one embodiment, a portion of the source 360 degree video file is selected according to the start time marker and the end time marker. In some embodiments, the 360 degree looping video file is then generated based at least on the portion of the source 360 degree video file and the projection type. In one embodiment, the portion of the source 360 degree video file is transcoded to generate the video data file. In some embodiments, the 360 degree looping video file is generated based at least on the source 360 degree video file, the projection type, and the resolution. In some embodiments, the 360 degree looping video file is transmitted to an electronic device for display.

In a method for displaying a 360 degree looping video file, a 360 degree looping video file is received at an electronic device, the 360 degree looping video file including a video data file and spatial mapping instructions. In one embodiment, the electronic device is a virtual reality headset. A portion of the video data file is displayed according to the spatial mapping instructions at the electronic device, wherein the video data file is projected onto a surface defined by the spatial mapping instructions. The portion is selected according to a user-defined position during the displaying.

Embodiments described herein provide for the creation and display of 360 degree looping video files, also referred to as immersive looping video files. In some embodiments, the 360 degree looping video files are short form looping video files (e.g., less than 60 seconds in length). In some embodiments, the 360 degree looping video files do not include sound.

A 360 degree looping video file is a piece of media that places a viewer at the center of the content, with media wrapping around the in a fully immersive experience. In one embodiment, while accessing the 360 degree looping video file on a computer (e.g., a desktop computer), the user interacts with the 360 degree looping video file using a cursor (e.g., via a mouse) to navigate around the content. In other embodiments, where the 360 degree looping video file is accessed via a handheld or mobile device (e.g., a smartphone or tablet), the 360 degree looping video file utilizes the spatial sensor of the device (e.g., gyroscopes) for navigating through the content. In other embodiments, where the 360 degree looping video file is accessed via a virtual reality (VR) headset, the 360 degree looping video file utilizes the spatial sensor of the device (e.g., gyroscopes) for navigating through the content. Embodiments described herein provide short form, silent, looping video files in an immersive, 360 degree viewable format.

In the described embodiments, the 360 degree looping video file is a looping video file (e.g., automatically restarts after completing a playback). The looping functionality can be implemented within the 360 degree looping video file itself or within a viewing application on the playback device. Moreover, it should be appreciated that the 360 degree looping video file can be any length.

360 degree looping video files are distinctly different from traditional 360 degree videos. For instance, in addition to generally having no sound, the 360 degree looping video files are short form looping video files that are easily consumable. Moreover, the described 360 degree looping video files are significantly smaller in file size (e.g., memory usage), as the 360 degree looping video files are short form rather than a traditional full length 360 video. The smaller file size allows for easy transmission, allowing for the 360 degree looping video files to be sent via text, email, messaging application, etc.

Embodiments described herein pertain to 360 degree looping video files. In one embodiment, the 360 degree looping video file is a Graphics Interchange Format (GIF) file. While embodiments described herein pertain to GIF files, it should be appreciated that other types of prerecorded media files, such as other types of video files, can be used herein. Moreover, it should be appreciated that any type of video file format can be used in accordance with the described embodiments, including but not limited to GIF, WebM, WebP, MPEG-4 (MP4), Animated Portable Network Graphics (APNG), Motion JPEG, Flash video (FLV), Windows Media video, M4V, etc. It should be appreciated that the prerecorded media file can be looped (e.g., via a HTML 5 video element or Flash video element) to automatically repeat.

In some embodiments, the 360 degree looping video file includes a video data file saved in a media format. For example, the video data file may be saved as an MP4 file or a WebM file. In additional to the video data file, the 360 degree looping video file includes spatial mapping instructions, where the spatial mapping instructions include a projection type (e.g., spherical projection) and instructions for projecting the video data file onto the projection type.

Embodiments described herein provide a 360 degree looping video file. The 360 degree looping video file includes all information needed for presenting the 360 degree looping video file at the receiving device. The described embodiments provide items of video content that place the user within the content, allowing the user to navigate (e.g., using a mouse or spatial sensors of a smart phone) through the looping media in an immersive experience. As the 360 degree looping video file is looping, the user can experience the content repeatedly from different perspectives, discovering something new with subsequent viewings. Hence, the embodiments of the present invention greatly extend beyond conventional methods of video presentation. Moreover, embodiments of the present invention amount to significantly more than merely using a computer to generate and display 360 degree looping video files. Instead, embodiments of the present invention specifically recite a novel process, rooted in computer technology, utilizing looping functionality and the inherent abilities of the display device to present immersive video content to a user, improving the user experience.

Example Computer System and Mobile Electronic Device

Turning now to the figures, FIG. 1 is a block diagram of an example computer system 100 upon which embodiments of the present invention can be implemented. FIG. 1 illustrates one example of a type of computer system 100 (e.g., a computer system) that can be used in accordance with or to implement various embodiments which are discussed herein.

It is appreciated that computer system 100 of FIG. 1 is only an example and that embodiments as described herein can operate on or within a number of different computer systems including, but not limited to, general purpose networked computer systems, embedded computer systems, mobile electronic devices, smart phones, server devices, client devices, various intermediate devices/nodes, stand alone computer systems, media centers, handheld computer systems, multi-media devices, and the like. In some embodiments, computer system 100 of FIG. 1 is well adapted to having peripheral tangible computer-readable storage media 102 such as, for example, an electronic flash memory data storage device, a floppy disc, a compact disc, digital versatile disc, other disc based storage, universal serial bus "thumb" drive, removable memory card, and the like coupled thereto. The tangible computer-readable storage media is non-transitory in nature.

Computer system 100 of FIG. 1 includes an address/data bus 104 for communicating information, and a processor 106A coupled with bus 104 for processing information and instructions. As depicted in FIG. 1, computer system 100 is also well suited to a multi-processor environment in which a plurality of processors 106A, 106B, and 106C are present. Conversely, computer system 100 is also well suited to having a single processor such as, for example, processor 106A. Processors 106A, 106B, and 106C may be any of various types of microprocessors. Computer system 100 also includes data storage features such as a computer usable volatile memory 108, e.g., random access memory (RAM), coupled with bus 104 for storing information and instructions for processors 106A, 106B, and 106C. Computer system 100 also includes computer usable non-volatile memory 110, e.g., read only memory (ROM), coupled with bus 104 for storing static information and instructions for processors 106A, 106B, and 106C. Also present in computer system 100 is a data storage unit 112 (e.g., a magnetic or optical disc and disc drive) coupled with bus 104 for storing information and instructions. Computer system 100 also includes an alphanumeric input device 114 including alphanumeric and function keys coupled with bus 104 for communicating information and command selections to processor 106A or processors 106A, 1066, and 106C. Computer system 100 also includes a cursor control device 116 coupled with bus 104 for communicating user input information and command selections to processor 106A or processors 106A, 106B, and 106C. In one embodiment, computer system 100 also includes a display device 118 coupled with bus 104 for displaying information.

Referring still to FIG. 1, display device 118 of FIG. 1 may be a liquid crystal device (LCD), light emitting diode display (LED) device, cathode ray tube (CRT), plasma display device, a touch screen device, or other display device suitable for creating graphic images and alphanumeric characters recognizable to a user. Cursor control device 116 allows the computer user to dynamically signal the movement of a visible symbol (cursor) on a display screen of display device 118 and indicate user selections of selectable items displayed on display device 118. Many implementations of cursor control device 116 are known in the art including a trackball, mouse, touch pad, touch screen, joystick or special keys on alphanumeric input device 114 capable of signaling movement of a given direction or manner of displacement. Alternatively, it will be appreciated that a cursor can be directed and/or activated via input from alphanumeric input device 114 using special keys and key sequence commands. Computer system 100 is also well suited to having a cursor directed by other means such as, for example, voice commands. In various embodiments, alphanumeric input device 114, cursor control device 116, and display device 118, or any combination thereof (e.g., user interface selection devices), may collectively operate to provide a graphical user interface (GUI) 130 under the direction of a processor (e.g., processor 106A or processors 106A, 106B, and 106C). GUI 130 allows user to interact with computer system 100 through graphical representations presented on display device 118 by interacting with alphanumeric input device 114 and/or cursor control device 116.

Computer system 100 also includes an I/O device 120 for coupling computer system 100 with external entities. For example, in one embodiment, I/O device 120 is a modem for enabling wired or wireless communications between computer system 100 and an external network such as, but not limited to, the Internet. In one embodiment, I/O device 120 includes a transmitter. Computer system 100 may communicate with a network by transmitting data via I/O device 120.

Referring still to FIG. 1, various other components are depicted for computer system 100. Specifically, when present, an operating system 122, applications 124, modules 126, and data 128 are shown as typically residing in one or some combination of computer usable volatile memory 108 (e.g., RAM), computer usable non-volatile memory 110 (e.g., ROM), and data storage unit 112. In some embodiments, all or portions of various embodiments described herein are stored, for example, as an application 124 and/or module 126 in memory locations within RAM 108, computer-readable storage media within data storage unit 112, peripheral computer-readable storage media 102, and/or other tangible computer-readable storage media.

Figure 2:
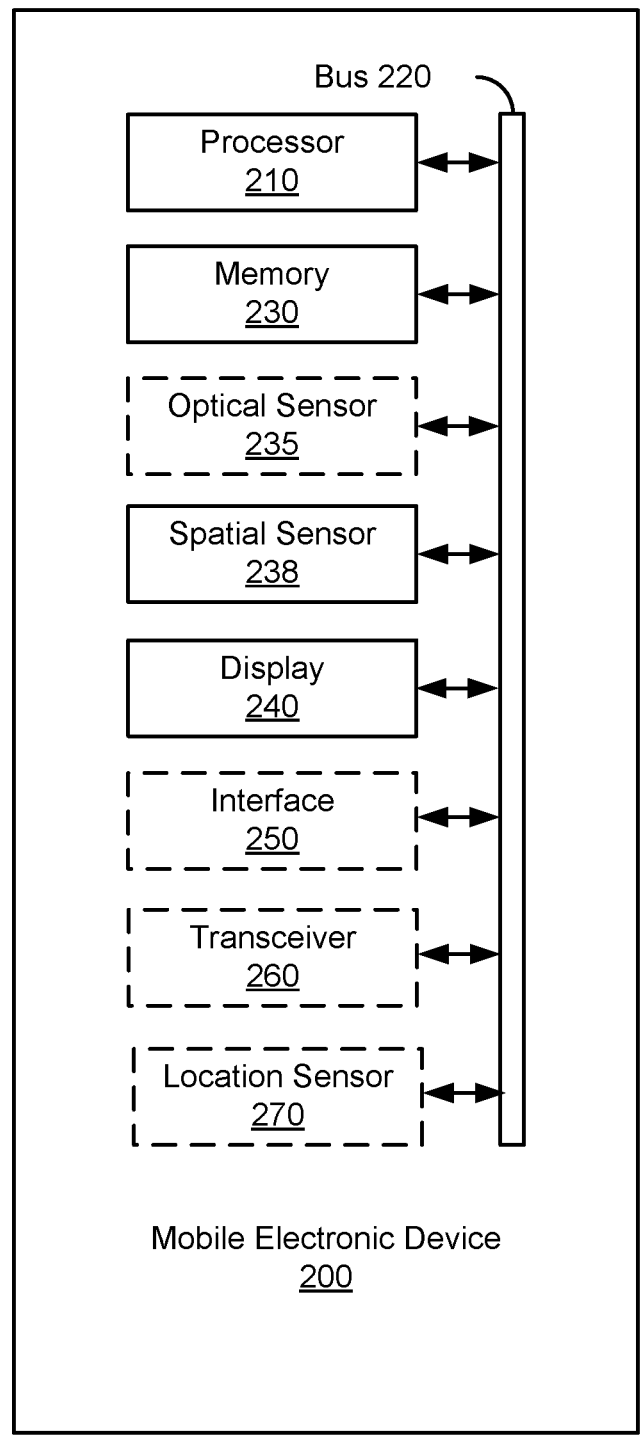
FIG. 2 illustrates an example mobile electronic device upon which embodiments described herein be implemented.

Turning now FIG. 2, a block diagram of an example mobile electronic device 200 is shown. As will be appreciated, mobile electronic device 200 may be implemented as a device or apparatus, such as a handheld mobile electronic device, that can be moved in space by a human user. That is, mobile electronic device 200 is small enough to be held in the hand of a human user, in various embodiments. For example, such a mobile electronic device may be, without limitation, a mobile telephone phone (e.g., smartphone, cellular phone, a cordless phone running on a local network, or any other cordless telephone handset), a wired telephone (e.g., a phone attached by a wire), a personal digital assistant (PDA), a video game player, video game controller, a navigation device, an activity or fitness tracker device (e.g., bracelet, clip, band, or pendant), a smart watch or other wearable device, a mobile internet device (MID), a personal navigation device (PND), a digital still camera, a digital video camera, a portable music player, a portable video player, a portable multi-media player, a remote control, a headset, or a combination of one or more of these devices.

As depicted in FIG. 2, mobile electronic device 200 may include a processor 210, a bus 220, a memory 230, at least one spatial sensor 238, and a display 240. Some embodiments of mobile electronic device 200 may further include one or more of an interface 250, a transceiver 260, a location sensor 270, and/or other components. In various embodiments, electrical power for mobile electronic device 200 is provided by a mobile power source such as a battery, when not being actively charged.

Processor 210 can be one or more microprocessors, central processing units (CPUs), DSPs, general purpose microprocessors, ASICs, ASIPs, FPGAs or other processors which run software programs or applications, which may be stored in memory 230, associated with the functions and capabilities of mobile electronic device 200.

Bus 220 may be any suitable bus or interface to include, without limitation, a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent. In the embodiment shown, processor 210, memory 230, spatial sensor 238, display 240, interface 250, transceiver 260, and other components of mobile electronic device 200 may be coupled communicatively through bus 220 in order to exchange commands and data. Depending on the architecture, different bus configurations may be employed as desired. For example, additional buses may be used to couple the various components of mobile electronic device 200, such as by using a dedicated bus between processor 210 and memory 230.

Memory 230 can be any suitable type of memory, including but not limited to electronic memory (e.g., read only memory (ROM), random access memory, or other electronic memory), hard disk, optical disk, or some combination thereof. Multiple layers of software can be stored in memory 230 for use with/operation upon processor 210. For example, an operating system layer can be provided for mobile electronic device 200 to control and manage system resources in real time, enable functions of application software and other layers, and interface application programs with other software and functions of mobile electronic device 200. Similarly, a user experience system layer may operate upon or be facilitated by the operating system. The user experience system may comprise one or more software application programs such as menu navigation software, games, device function control, gesture recognition, image processing or adjusting, voice recognition, navigation software, communications software (such as telephony or wireless local area network (WLAN) software), and/or any of a wide variety of other software and functional interfaces for interaction with the user can be provided. In some embodiments, multiple different applications can be provided on a single mobile electronic device 200, and in some of those embodiments, multiple applications can run simultaneously as part of the user experience system.

Optical sensor 235 may comprise, without limitation: a video capture device, a camera, and infrared camera, or other type of optical sensor for capturing a video of a person, an object, and/or a scene. In one example, optical sensor 235 is a back-side optical sensor (e.g., rear-facing camera) or a front-side optical sensor (e.g., front-facing camera). It should be appreciated that mobile electronic device 200 may include more than one optical sensor. In one example, mobile electronic device 200 includes a first optical sensor 235 that is a back-side optical sensor (e.g., rear-facing camera) and a second optical sensor 235 that is a front-side optical sensor (e.g., front-facing camera).

Spatial sensor 238 may comprise, without limitation: a gyroscope, an accelerometer, or other type of spatial sensor for determining movement and position of mobile electronic device 200.

Display 240, may be a liquid crystal device, (organic) light emitting diode device, or other display device suitable for creating and visibly depicting graphic images and/or alphanumeric characters recognizable to a user. Display 240 may be configured to output images viewable by the user and may additionally or alternatively function as a viewfinder for camera. Display 240 is configured to display video captured at optical sensor 235.

Interface 250, when included, can be any of a variety of different devices providing input and/or output to a user, such as audio speakers, touch screen integrated with display 240, real or virtual buttons, joystick, slider, knob, printer, scanner, computer network I/O device, other connected peripherals and the like.

Transceiver 260, when included, may be one or more of a wired or wireless transceiver which facilitates receipt of data at mobile electronic device 200 from an external transmission source and transmission of data from mobile electronic device 200 to an external recipient. By way of example, and not of limitation, in various embodiments, transceiver 260 comprises one or more of: a cellular transceiver, a wireless local area network transceiver (e.g., a transceiver compliant with one or more Institute of Electrical and Electronics Engineers (IEEE) 802.11 specifications for wireless local area network communication), a wireless personal area network transceiver (e.g., a transceiver compliant with one or more IEEE 802.15 specifications for wireless personal area network communication), and a wired a serial transceiver (e.g., a universal serial bus for wired communication).

Location sensor 270, when included, may be a sensor for determining a location of mobile electronic device 200, such as a navigation satellite system sensor such as a Global Navigation Satellite System (GNSS) receiver (e.g., Global Positioning System (GPS) sensor) a and/or other component configured to determine the location of mobile electronic device 200 from external radio signals. It is noted that the functionality of location sensor 270 may be implemented by processor 210.

Figure 3:
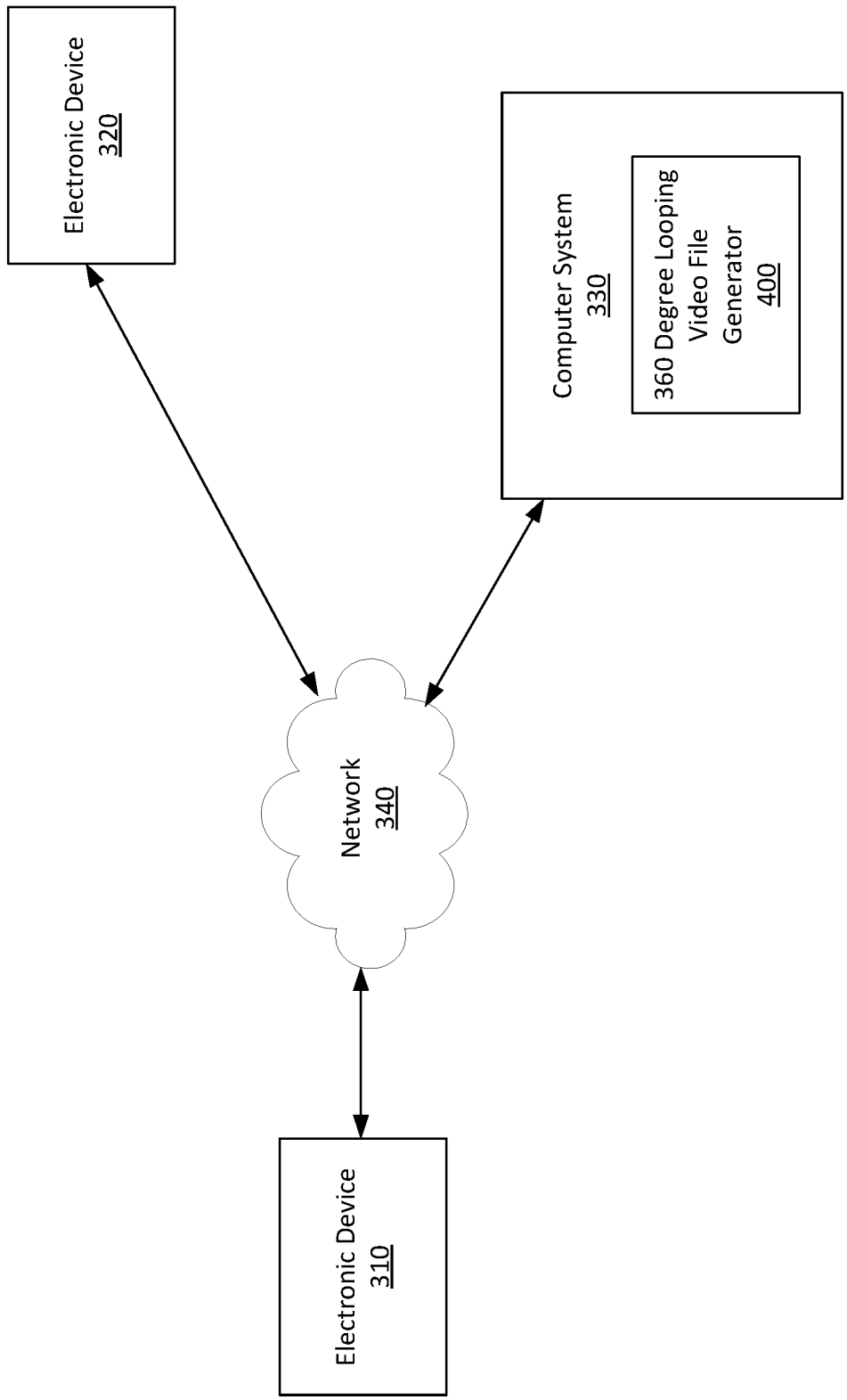
FIG. 3 illustrates an example network upon which embodiments described herein may be implemented.

FIG. 3 illustrates an example communication network 340 upon which embodiments described herein may be implemented. FIG. 3 illustrates electronic device 310, electronic device 320, and computer system 330, all of which are communicatively coupled via network 340. It should be appreciated that mobile electronic device 310, electronic device 320, and remote computer system 330, may be implemented as a computer system 100 or mobile electronic device 200, and/or include any combination of the components of computer system 100 or mobile electronic device 200. In some embodiments, mobile electronic device 310 and electronic device 320 are mobile electronic devices (e.g., smart phones) including messaging applications for communicating electronic messages via a graphical user interface.

In accordance with various embodiments, electronic devices 310 and 320 are capable of transmitting and receiving electronic messages including media files. Electronic devices 310 and 320 may be associated with a particular user. For example, a first user, may be associated with mobile electronic device 310 and a second user, may be associated with electronic device 320. In one embodiment, remote computer system 330 includes a 360 degree looping video file generator 400 for creating 360 degree looping video files.

Example Creation and Use of a 360 Degree Looping Video File

Figure 4:
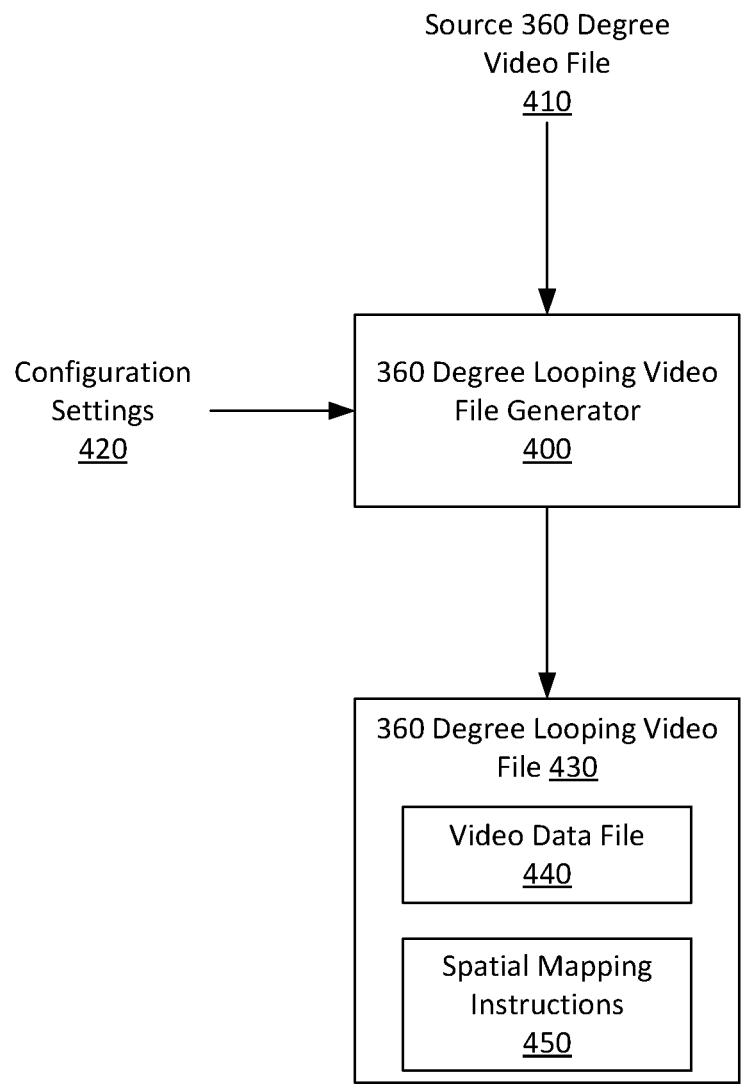
FIG. 4 illustrates an example 360 degree looping video file generation process, in accordance with various embodiments.

FIG. 4 illustrates an example 360 degree looping video file generation process. A source 360 degree video file 410 is received at a 360 degree looping video file generator 400. It should be appreciated that the source 360 degree video file can be generated via a 360 degree camera, or can be generated via a compilation of video files. In various embodiments, the 360 degree video file is such that the edges are seamless such that a viewer experience is fully immersive. In some embodiments, the source 360 degree video file is received from a VR headset that records a user's perspective within a VR space.

At least one configuration setting 420 is also received at the 360 degree looping video file generator 400. The configuration settings 420 include, without limitation: a start time marker, an end time marker, a projection type, a resolution, etc. Based on the source 360 degree video file 410 and the configuration settings 420, the 360 degree looping video file generator 400 generates a 360 degree looping video file 430. The 360 degree looping video file 430 includes a video data file 440 and spatial mapping instructions 450, where the spatial mapping instructions are used during playback of the 360 degree looping video file 430 for translating pixels of the video data file 440 to the appropriate location as directed by the selected projection type.

It should be appreciated that source 360 degree video file 410 can be generated via a 360 degree camera, or can be generated via a compilation of video files. In various embodiments, the 360 degree video file 410 is such that the edges are seamless such that a viewer experience is fully immersive. In some embodiments, the source 360 degree video file 410 is received from a VR headset that records a user's perspective within a VR space.

The source 360 degree video file 410 is processed to generate the 360 degree looping video file 430. In one embodiment, a portion of the source 360 degree video 410 is selected for generating the 360 degree looping video file 430. In one embodiment, a start time and an end time within the source 360 degree video file are identified by configuration settings 420 to define the segment of the source 360 degree video file 410 for conversion to the 360 degree looping video file 430. For example, a thirty second segment of a larger source 360 degree video file 410 is selected. The selected segment of the source 360 degree video file 410 is transcoded to generate a video data file 440.

Spatial mapping instructions 450, where the spatial mapping instructions 450 include a projection type (e.g., spherical projection) and instructions for projecting the video data file onto the projection type, are also generated for enabling appropriate playback of the 360 degree looping video file 430. In one embodiment, a projection type of the 360 degree looping video file 430 is selected at configuration settings 420. For example, a spherical projection type allows for the 360 degree looping video file 430 to be projected onto a spherical surface. Other projection types include plan, an equirectangular layout, and a cube map projection. The spatial mapping instructions provide the instructions for a playback application to project the video data file onto the selected projection type.

For example, during playback of the video data file of the 360 degree looping video file 430, the spatial mapping instructions translate pixels of the video data file 440 to the appropriate location, such that the 360 degree looping video file 430 is viewed with the proper perspective. It should be appreciated that without the spatial mapping instructions 450, playback of the video data file 440 may appear distorted, have inappropriate perspective, and/or would be unwatchable.

It should be appreciated that 360 degree looping video file generator 400 can be implemented as hardware, software, or any combination thereof. For example, 360 degree looping video file generator 400 may be executed by computer system 100 of FIG. 1. In some embodiments, individual components of 360 degree looping video file generator 400 may be distributed over multiple computing devices. For example, with reference to FIG. 3, 360 degree looping video file generator 400 may access and/or receive source 360 degree video file 410 and/or configuration settings 420 from remote computer systems communicatively coupled to network 340 (e.g., a library of 360 degree video files).

In some embodiments, source 360 degree video file 410 is received from a library of prerecorded video files (e.g., maintained by a service hosting prerecorded video files) over a network connection (e.g., network 340). In other embodiments, source 360 degree video file 410 is located on a local computer. It should be appreciated that the source 360 degree video file 410 can be received from any source, and can have any creator. In some embodiments, the source 360 degree video file 410 is a looping video file (e.g., automatically restarts after completing a playback). The looping functionality can be implemented within source 360 degree video file 410 itself, within 360 degree looping video file generator, or within another application on the playback device. Moreover, it should be appreciated that source 360 degree video file 410 can be any length. In some embodiments, e.g., where source 360 degree video file 410 is looping, source 360 degree video file 410 is less than 30 seconds in length.

In one embodiment, the prerecorded video file is a Graphics Interchange Format (GIF) file. While embodiments described herein pertain to GIF files, it should be appreciated that other types of prerecorded media files, such as other types of video files, can be used herein. Moreover, it should be appreciated that any type of video file format can be used in accordance with the described embodiments, including but not limited to GIF, WebM, WebP, MPEG-4 (MP4), Animated Portable Network Graphics (APNG), Motion JPEG, Flash video (FLV), Windows Media video, M4V, etc. It should be appreciated that the prerecorded media file can be looped (e.g., via a HTML 5 video element or Flash video element) to automatically repeat.

Embodiments described herein provide for the display of 360 degree looping video files. In one embodiment, a 360 degree looping video file 430 is received, e.g., at a mobile electronic device 200. It should be appreciated that the 360 degree looping video file 430 can be received any number of ways, including without limitation, as an email attachment, as an attachment to a text message, as an attachment within a messaging application, via accessing a website, via accessing a standalone application, etc.

The 360 degree looping video file 430 includes a video data file 440 and spatial mapping instructions 450. The spatial mapping instructions 450 are understandable by a playback mechanism for translating pixels of the video onto a projection type defined by the spatial mapping instructions 450.

Moreover, during playback of the 360 degree looping video file 430, a relative position of the viewer is determined, such that the selected portion of the 360 degree looping video file 430 is displayed during playback. Depending on the playback device upon which the 360 degree looping video file 430 is displayed, the positioning mechanism is different. For example, where the playback device is a computer, e.g., computer system 100, a user controls the positioning within the 360 degree looping video file 430 via a mouse. In another example, where the playback device is a mobile or handheld device, e.g., mobile electronic device 200, the user controls the positioning within the 360 degree looping video file 430 by moving, rotating, or otherwise repositioning the mobile device, as detected by spatial sensors of the mobile device. In another example, where the playback device is a VR headset, the user controls the positioning within the 360 degree looping video file 430 by moving, rotating, or otherwise repositioning their head, and thus the VR headset, as detected by spatial sensors of the VR headset.

It should be appreciated that the size of the displayed portion of the 360 degree looping video file 430 is also a function of the screen size of the playback device. For example, playback on a computer or mobile device controls the displayed portion of the 360 degree looping video file 430. In a VR headset, the displayed portion of a 360 degree looping video file 430 may be larger than a displayed portion of the same 360 degree looping video file 430 on a mobile device or computer, as a VR headset, in providing immersion into the 360 degree looping video file 430, extends out and possibly beyond peripheral vision of the viewer.

Figure 5:
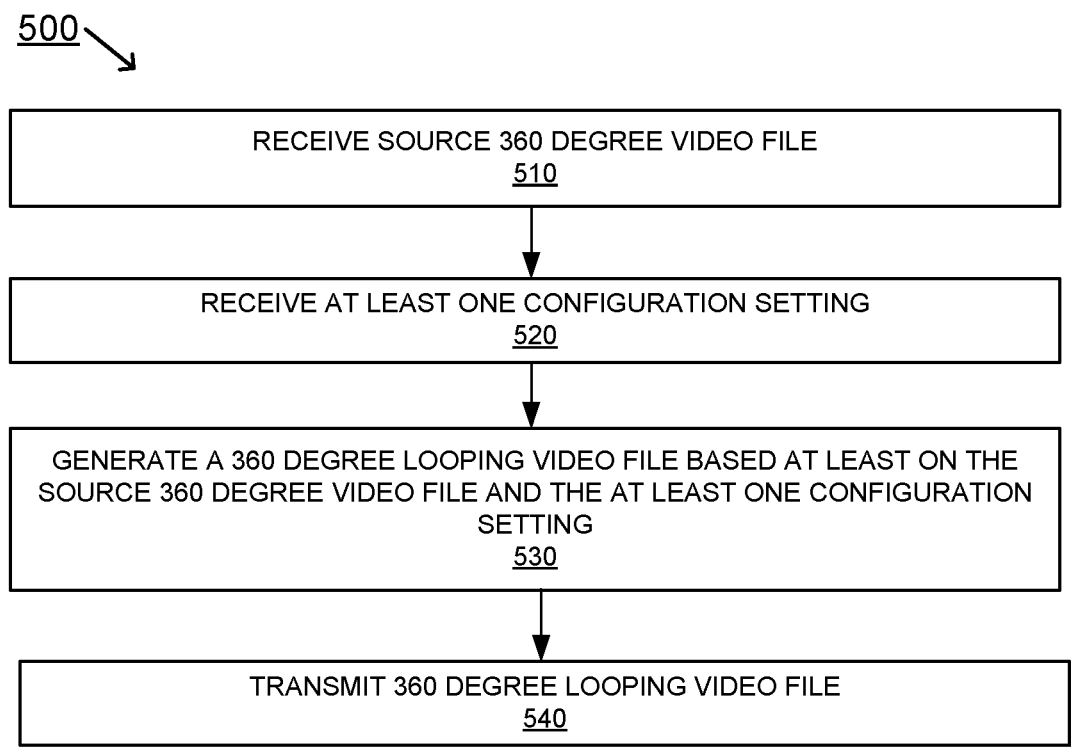
FIG. 5 illustrates a flow diagram of an example method for creating a 360 degree looping video file, in accordance with various embodiments.

Example Methods of Operation of Generating and Displaying a 360 Degree Looping Video File FIG. 5 illustrates a flow diagram 500 of an example method for creating a 360 degree looping video file, according to various embodiments. Procedures of this method may be described with reference to elements and/or components of various figures described herein. It is appreciated that in some embodiments, the procedures may be performed in a different order than described, that some of the described procedures may not be performed, and/or that one or more additional procedures to those described may be performed. Flow diagram 500 includes some procedures that, in various embodiments, are carried out by one or more processors under the control of computer-readable and computer-executable instructions that are stored on non-transitory computer-readable storage media. It is further appreciated that one or more procedures described in flow diagram 500 may be implemented in hardware, or a combination of hardware with firmware and/or software.

At procedure 510 of flow diagram 500, a source 360 degree video file is received. In one embodiment, the source 360 degree video file is a short form looping prerecorded video file. In some embodiments, the source 360 degree video file is received from a virtual reality headset.

At procedure 520, at least one configuration setting for the 360 degree looping video file is received, the at least one configuration including a projection type of the 360 degree looping video file. In some embodiments, the configuration settings also include at least one of a start time marker, an end time marker, a resolution, etc.

At procedure 530, the 360 degree looping video file is generated based at least on the source 360 degree video file and the projection type, the 360 degree looping video file including a video data file and spatial mapping instructions. The 360 degree looping video file, when executed at an electronic device, displays the video data file according to the spatial mapping instructions. In one embodiment, a portion of the source 360 degree video file is selected according to the start time marker and the end time marker. In some embodiments, the 360 degree looping video file is then generated based at least on the portion of the source 360 degree video file and the projection type. In one embodiment, the portion of the source 360 degree video file is transcoded to generate the video data file. In some embodiments, the 360 degree looping video file is generated based at least on the source 360 degree video file, the projection type, and the resolution.

In some embodiments, as shown at procedure 540, the 360 degree looping video file is transmitted to an electronic device for display.

Figure 6:
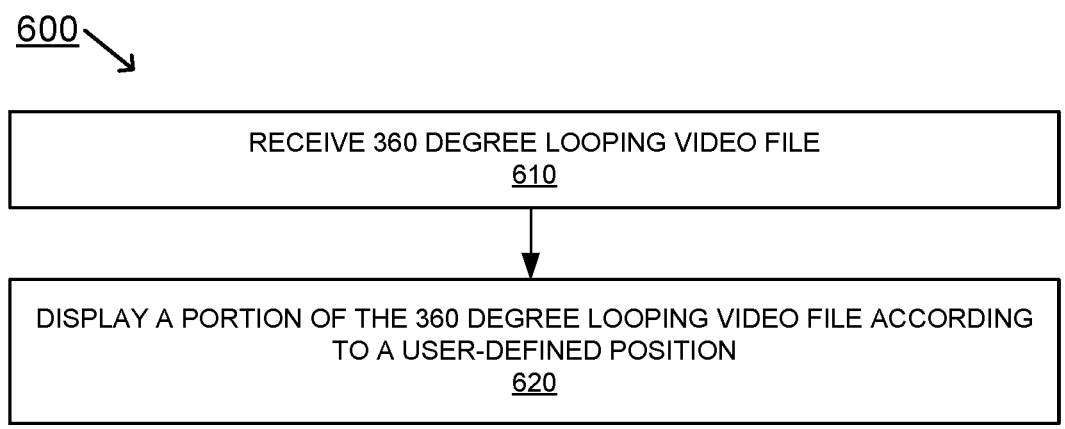
FIG. 6 illustrates a flow diagram of an example method for displaying a 360 degree looping video file, according to various embodiments.

FIG. 6 illustrates a flow diagram 600 of an example method for displaying a 360 degree looping video file, according to various embodiments. Procedures of this method may be described with reference to elements and/or components of various figures described herein. It is appreciated that in some embodiments, the procedures may be performed in a different order than described, that some of the described procedures may not be performed, and/or that one or more additional procedures to those described may be performed. Flow diagram 600 includes some procedures that, in various embodiments, are carried out by one or more processors under the control of computer-readable and computer-executable instructions that are stored on non-transitory computer-readable storage media. It is further appreciated that one or more procedures described in flow diagram 600 may be implemented in hardware, or a combination of hardware with firmware and/or software.

At procedure 610 of flow diagram 600, a 360 degree looping video file is received, the 360 degree looping video file including a video data file and spatial mapping instructions. At procedure 620, a portion of the video data file is displayed according to the spatial mapping instructions, wherein the video data file is projected onto a surface defined by the spatial mapping instructions, wherein the portion is selected according to a user-defined position during the displaying.

CONCLUSION

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. Many aspects of the different example embodiments that are described above can be combined into new embodiments. The description as set forth is not intended to be exhaustive or to limit the embodiments to the precise form disclosed. Rather, the specific features and acts described above are disclosed as example forms of implementing the claims.

Reference throughout this document to "one embodiment," "certain embodiments," "an embodiment," "various embodiments," "some embodiments," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A method for generating a 360 degree looping video file, the method comprising:
   receiving, by one or more processors, a source 360 degree video file;
   receiving, by the one or more processors, at least one configuration setting for a 360 degree looping video file, the at least one configuration setting comprising a projection type of the 360 degree looping video file, a start time marker and an end time marker;
   selecting, by the one or more processors, a portion of the source 360 degree video file according to the start time marker and the end time marker; and
   generating, by the one or more processors, the 360 degree looping video file based at least on the portion of the source 360 degree video file and the projection type, the 360 degree looping video file comprising a video data file and spatial mapping instructions, wherein the 360 degree looping video file, when executed at an electronic device, displays the video data file according to the spatial mapping instructions.

2. The method of claim 1, wherein the source 360 degree video file is a short form looping prerecorded video file.

3. The method of claim 1, wherein the source 360 degree video file is received from a virtual reality headset.

4. The method of claim 3, further comprising:
   transmitting the 360 degree looping video file to the electronic device.

5. The method of claim 1, wherein the generating the 360 degree looping video file based at least on the portion of the source 360 degree video file and the projection type comprises:
   transcoding the portion of the source 360 degree video file to generate the video data file.

6. The method of claim 1, wherein the at least one configuration setting comprises a resolution.

7. A method for generating a 360 degree looping video file, the method comprising:
   receiving, by one or more processors, a source 360 degree video file;
   receiving, the one or more processors, at least one configuration setting for a 360 degree looping video file, the at least one configuration setting comprising a projection type of the 360 degree looping video file and a resolution; and
   generating, by the one or more processors, the 360 degree looping video file based at least on the source 360 degree video file, the projection type and the resolution, the 360 degree looping video file comprising a video data file and spatial mapping instructions, wherein the 360 degree looping video file, when executed at an electronic device, displays the video data file according to the spatial mapping instructions.

8. The method of claim 7, wherein the source 360 degree video file is received from a virtual reality headset.

9. The method of claim 7, further comprising:
   transmitting the 360 degree looping video file to the electronic device.

10. The method of claim 7 further comprising:
    transmitting the 360 degree looping video file to the electronic device; and
    displaying a portion of the video data file according to the spatial mapping instructions at the electronic device, wherein the video data file is projected onto a surface defined by the spatial mapping instructions, wherein the portion is selected according to a user-defined position during the displaying.

11. The method of claim 10, wherein the electronic device is a virtual reality, headset.

12. A non-transitory computer readable storage medium having computer readable program code stored thereon for causing a computer system to perform a method for generating a 360 degree looping video file, the method comprising:
- receiving a source 360 degree video file;
- receiving at least one configuration setting for a 360 degree looping video file, the at least one configuration setting comprising a projection type of the 360 degree looping video file, a start time marker and an end time marker;
- selecting a portion of the source 360 degree video file according to the start time marker and the end time marker; and
- generating the 360 degree looping video file based at least on the portion of the source 360 degree video file and the projection type, the 360 degree looping video file comprising a video data file and spatial mapping instructions, wherein the 360 degree looping video file, when executed at an electronic device, displays the video data file according to the spatial mapping instructions.

13. The non-transitory computer readable storage medium of claim 12, wherein the source 360 degree video file is a short form looping prerecorded video file.

14. The non-transitory computer readable storage medium of claim 12, wherein the source 360 degree video file is received from a virtual reality headset.

15. The non-transitory computer readable storage medium of claim 12, the method further comprising:
- transmitting the 360 degree looping video file to the electronic device.

16. The non-transitory computer readable storage medium of claim 12, wherein the generating the 360 degree looping video file based at least on the portion of the source 360 degree video file and the projection type comprises:
- transcoding the portion of the source 360 degree video file to generate the video data file.

17. The non-transitory computer readable storage medium of claim 12, wherein the at least one configuration setting comprises a resolution.

18. A non-transitory computer readable storage medium having computer readable program code stored thereon for causing a computer system to perform a method for generating a 360 degree looping video file, the method comprising:
- receiving a source 360 degree video file;
- receiving at least one configuration setting for a 360 degree looping video file, the at least one configuration setting comprising a projection type of the 360 degree looping video file and a resolution; and
- generating the 360 degree looping video file based at least on the source 360 degree video file, the projection type and the resolution, the 360 degree looping video file comprising a video data file and spatial mapping instructions, wherein the 360 degree looping video file, when executed at an electronic device, displays the video data file according to the spatial mapping instructions.

19. The non-transitory computer readable storage medium of claim 18, wherein the source 360 degree video file is received from a virtual reality headset.

20. The non-transitory computer readable storage medium of claim 18 wherein the generating the 360 degree looping video file comprises:
- transcoding the source 360 degree video file to generate the video data file.

\* \* \* \* \*

UNITED STATES PATENT AND TRADEMARK OFFICE
CERTIFICATE OF CORRECTION

PATENT NO. : 10,944,905 B2
APPLICATION NO. : 16/413408
DATED : March 9, 2021
INVENTOR(S) : Rabbat et al.

Page 1 of 1

It is certified that error appears in the above-identified patent and that said Letters Patent is hereby corrected as shown below:

In the Claims

In Column 14, Line 65, in Claim 11, delete "reality," and insert --reality-- therefor Signed and Sealed this
First Day of June, 2021

Drew Hirshfeld
*Performing the Functions and Duties of the
Under Secretary of Commerce for Intellectual Property and
Director of the United States Patent and Trademark Office*